United States Patent
Osogami et al.

(10) Patent No.: US 12,056,206 B2
(45) Date of Patent: Aug. 6, 2024

(54) TRAINING ASYMMETRIC KERNELS OF DETERMINANTAL POINT PROCESSES

(71) Applicant: INTERNATIONAL BUSINESS MACHINES CORPORATION, Armonk, NY (US)

(72) Inventors: Takayuki Osogami, Kanagawa-ken (JP); Rudy Raymond Harry Putra, Kanagawa-ken (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 741 days.

(21) Appl. No.: 16/783,535

(22) Filed: Feb. 6, 2020

(65) Prior Publication Data
US 2021/0248502 A1   Aug. 12, 2021

(51) Int. Cl.
*G06F 17/15* (2006.01)
*G06F 17/16* (2006.01)
*G06F 18/214* (2023.01)
*G06N 7/01* (2023.01)
*G06N 20/10* (2019.01)

(52) U.S. Cl.
CPC ............ *G06F 17/153* (2013.01); *G06F 17/16* (2013.01); *G06F 18/214* (2023.01); *G06N 7/01* (2023.01); *G06N 20/10* (2019.01)

(58) Field of Classification Search
CPC ........ G06N 7/005; G06N 20/10; G06F 17/16; G06K 9/6256
See application file for complete search history.

(56) References Cited

U.S. PATENT DOCUMENTS

| | | |
|---|---|---|
| 2016/0350832 A1 | 12/2016 | Franklin et al. |
| 2017/0228433 A1 | 8/2017 | Gartrell et al. |

OTHER PUBLICATIONS

Mariet et al., "Fixed-point algorithms for learning determinantal point processes," arXiv:1508.00792v2 [cs.LG] Oct. 8, 2015 (Year: 2015).*

Gartrell et al., "Learning Nonsymmetric Determinantal Point Processes," 33rd Conference on Neural Information Processing Systems (NeurIPS 2019), Vancouver, Canada, arXiv:1905.12962v2 [cs.LG] Dec. 5, 2019 (Year: 2019).*

Warlop et al., "Tensorized Determinantal Point Processes for Recommendation," KDD '19, Aug. 4-8, 2019, Anchorage, AK, USA (Year: 2019).*

(Continued)

*Primary Examiner* — Miranda M Huang
*Assistant Examiner* — Yao David Huang
(74) *Attorney, Agent, or Firm* — Tutunjian & Bitetto, P.C.; James Olsen

(57) ABSTRACT

A method for a determinantal Point Process-based prediction includes obtaining, using a hardware processor, a training data set stored on one or more computer readable storage mediums operably coupled to the hardware processor, training an asymmetric kernel of a Determinantal Point Process (DPP) from a training data set by calculating an inverse matrix of a sum of the asymmetric kernel and an identity matrix in a recursive manner to reduce time and computational resources utilized, and determining a prediction model by training the asymmetric kernel as at least part of a prediction model to make a prediction.

17 Claims, 7 Drawing Sheets

(56) References Cited

OTHER PUBLICATIONS

Miceli Barone, A.V., "Low-Rank Passthrough Neural Networks," arXiv:1603.03116v3 [cs.LG] Jul. 9, 2018 (Year: 2018).*

Brunel, "Learning Signed Determinantal Point Processes through the Principal Minor Assignment Problem," arXiv:1811.00465v1 [math.ST] Nov. 1, 2018 (Year: 2018).*

"Recursive," Cambridge Dictionary [online]. Retrieved from <https://web.archive.org/web/20160722234949/https://dictionary.cambridge.org/us/dictionary/english/recursive>. Archived Jul. 22, 2016. Retrieved on May 24, 2023. (Year: 2023).*

"Recursive," dictionary.com. Retrieved from <https://web.archive.org/web/20191019212129/htttps://www.dictionary.com/browse/recursive>. Archived Oct. 19, 2019. Retrieved on May 24, 2023. (Year: 2019).*

"Recursion," dictionary.com. Retrieved from <https://web.archive.org/web/20190421075120/https://www.dictionary.com/browse/recursion>. Archived Apr. 21, 2019. Retrieved on May 24, 2023. (Year: 2019).*

Han et al., "Scalable Sampling for Nonsymmetric Determinantal Point Processes," arXiv:2201.08417v2 [cs.LG] Apr. 19, 2022 (Year: 2022).*

Wang et al., "On cone of nonsymmetric positive semidefinite matrices," Linear Algebra and its Applications 433 (2010) 718-736 (Year: 2010).*

Grief et al., "Numerical Equivalences Among Krylov Subspace Algorithms for Skew-Symmetric Matrices" SIAM J. Matrix Anal. Appl. vol. 37, No. 3, pp. 1071-1087 (2016) (Year: 2016).*

Drew et al., "The No Long Odd Cycle Theorem for Completely Positive Matrices" in D. Aldous et al. (eds.), Random Discrete Structures, Springer-Verlag Berlin Heidelberg (1996) (Year: 1996).*

Gartrell et al., "Scalable Learning and MAP Inference for Nonsymmetric Determinantal Point Processes," arXiv:2006.09862v1 [cs.LG] Jun. 17, 2020 (Year: 2020).*

"'Degrees of freedom' of some low-rank skew-symmetric matrices," Mathematics Stack Exchange, archived Feb. 9, 2017. Retrieved on Dec. 12, 2023 from <https://web.archive.org/web/20170209111502/https://math.stackexchange.com/questions/963985/degrees-of-freedom-of-some-low-rank-skew-symmetric-matrices> (Year: 2017).*

Chen et al., "Improving the Diversity of Top-N Recommendation via Determinantal Point Process", Large Scale Recommendation Systems Workshop 2017, Como, Italy. Aug. 2017. (pp. 1-8.).

Wu et al., "Asymmetric Kernel Learning", Microsoft Research Technical Report. Jun. 22, 2010. (pp. 1-23.).

List of IBM Patents or Patent Applications Treated as Related dated May 4, 2020, 2 pages.

Victor-Emmanuel Brunel, "Learning Signed Determinantal Point Processes through the Principal Minor Assignment Problem", 32nd Conference on Neural Information Processing Systems (NeurIPS 2018). (pp. 1-10.).

Gartrell et al., "Learning Nonsymmetric Determinantal Point Processes", arXiv:1905.12962v1 [cs.LG] May 30, 2019.

Osogami et al., "Dynamic Determinantal Point Processes", Thirty-Second AAAI Conference on Artificial Intelligence. Apr. 29, 2018. (pp. 1-8.).

Saenko et al., "What You Saw is Not What You Get: Domain Adaptation Using Asymmetric Kernel Transforms", Computer Vision and Pattern Recognition 2011. Jun. 20, 2011. (pp. 1785-1792.).

* cited by examiner

Training Data Set *D*
{
(item 1, item 10, item 14) ~402
(item 1, item 8) ~404
(item 21, item 101, item 32, item 83)
⋮ ~406
}

*FIG. 4*

For a dataset $\mathcal{D} = \{\alpha_i\}_i$, the parameters may be iteratively updated:

---
Algorithm 1 Learning L via gradient ascent
---
1: Initialize $\lambda, V, u^{(k)}, v^{(k)}, \forall k$
2: repeat
3:     $\Delta_\lambda = -\nabla_\lambda \log \det(I + L)$
4:     $\Delta_V = -\nabla_V \log \det(I + L)$
5:     $\Delta_{u^{(k)}} = -\nabla_{u^{(k)}} \log \det(I + L), \forall k$
6:     $\Delta_{v^{(k)}} = -\nabla_{v^{(k)}} \log \det(I + L), \forall k$
7:     for $\alpha \in \mathcal{D}$ do
8:         $(\Delta_\lambda)_\alpha = (\Delta_\lambda)_\alpha + \nabla_{\lambda_\alpha} \log \det(L_{\alpha\alpha})$
9:         $(\Delta_V)_{\alpha\Omega} = (\Delta_V)_{\alpha\Omega} + \nabla_{V_{\alpha\Omega}} \log \det(L_{\alpha\alpha})$
10:       $(\Delta_{u^{(k)}})_\alpha = (\Delta_{u^{(k)}})_\alpha + \nabla_{(u^{(k)})_\alpha} \log \det(L_{\alpha\alpha}), \forall k$
11:       $(\Delta_{v^{(k)}})_\alpha = (\Delta_{v^{(k)}})_\alpha + \nabla_{(v^{(k)})_\alpha} \log \det(L_{\alpha\alpha}), \forall k$
12:     $\lambda = \lambda + \eta \Delta_\lambda$
13:     $V = V + \eta \Delta_V$
14:     $u^{(k)} = u^{(k)} + \eta \Delta_{u^{(k)}}, \forall k$
15:     $v^{(k)} = v^{(k)} + \eta \Delta_{v^{(k)}}, \forall k$
16: until A stopping condition is met

Algorithm 2 Inverting $\mathbf{I} + \mathbf{L}$ with repeated rank-two update 1: $\mathbf{G}^{-1} \leftarrow \text{Diag}(1/(1 + \exp(\boldsymbol{\lambda})))$, where the vector operations are elementwise
2: $\mathbf{A}_0^{-1} \leftarrow \mathbf{G}^{-1} - \mathbf{G}^{-1}\mathbf{V}(\mathbf{I} + \mathbf{V}^\top \mathbf{G}^{-1}\mathbf{V})^{-1}\mathbf{V}^\top \mathbf{G}^{-1}$
3: for $k = 1, \ldots, K$ do
4:      $a \leftarrow (\mathbf{u}^{(k)})^\top \mathbf{A}_{k-1}^{-1} \mathbf{v}^{(k)}$
5:      $b \leftarrow (\mathbf{v}^{(k)})^\top \mathbf{A}_{k-1}^{-1} \mathbf{u}^{(k)}$
6:      $c \leftarrow (\mathbf{u}^{(k)})^\top \mathbf{A}_{k-1}^{-1} \mathbf{u}^{(k)}$
7:      $d \leftarrow (\mathbf{v}^{(k)})^\top \mathbf{A}_{k-1}^{-1} \mathbf{v}^{(k)}$
8:      $\mathbf{w} \leftarrow \mathbf{A}_{k-1}^{-1} \mathbf{u}$
9:      $\mathbf{x} \leftarrow \mathbf{A}_{k-1}^{-1} \mathbf{v}$
10:      $\mathbf{y}^\top \leftarrow \mathbf{u}^\top \mathbf{A}_{k-1}^{-1}$
11:      $\mathbf{z}^\top \leftarrow \mathbf{v}^\top \mathbf{A}_{k-1}^{-1}$
12:      $\mathbf{A}_k^{-1} \leftarrow \mathbf{A}_{k-1}^{-1} + \dfrac{-(1-a)\mathbf{wz}^\top + (1+b)\mathbf{xy}^\top - c\mathbf{xz}^\top - d\mathbf{wy}^\top}{(1+b)(1-a)+cd}$
13: Return $\mathbf{A}_K^{-1}$ as $(\mathbf{I} + \mathbf{L})^{-1}$

*FIG. 6*

TRAINING ASYMMETRIC KERNELS OF DETERMINANTAL POINT PROCESSES

BACKGROUND

Technical Field

The present invention relates to training asymmetric kernels of Determinantal Point Processes.

Description of the Related Art

Determinantal Point Processes (DPP) have been used to produce a probability distribution in a prediction model. In a DPP, the probability distribution is represented by using a kernel matrix. Use of an asymmetric kernel matrix may enable a higher quality probability distribution than a symmetric kernel matrix. However, training the asymmetric kernel matrix takes enormous time, such as $O(N^3)$ for an N×N kernel matrix, and thus takes many computational resources.

SUMMARY

According to an aspect of the present invention, a computer-implemented method includes obtaining, using a hardware processor, a training data set stored on one or more computer readable storage mediums operably coupled to the hardware processor, training an asymmetric kernel of a Determinantal Point Process (DPP) from a training data set by calculating an inverse matrix of a sum of the asymmetric kernel and an identity matrix in a recursive manner to reduce time and computational resources utilized, and determining a prediction model by training the asymmetric kernel as at least part of the prediction model to make a prediction In accordance with another aspect of the present invention, an apparatus is configured to perform the computer-implemented method, and a computer program product storing instructions embodied on a computer-readable medium or programmable circuitry, that, when executed by a processor or the programmable circuitry, cause the processor or the programmable circuitry to perform the method.

The summary clause does not necessarily describe all features of the embodiments of the present invention. Embodiments of the present invention may also include sub-combinations of the features described above.

BRIEF DESCRIPTION OF THE DRAWINGS

FIG. 4 shows an example of a training data set D according to an embodiment of the present invention;

FIG. 5 shows an exemplary algorithm to perform an operational flow for training asymmetric kernels of Determinantal Point Processes, according to an embodiment of the present invention;

FIG. 6 shows an exemplary algorithm to calculate variations in parameters according to an embodiment of the present invention.

DETAILED DESCRIPTION

Hereinafter, example embodiments of the present invention will be described. The example embodiments shall not limit the invention according to the claims, and the combinations of the features described in the embodiments are not necessarily essential to the invention.

Figure 1:
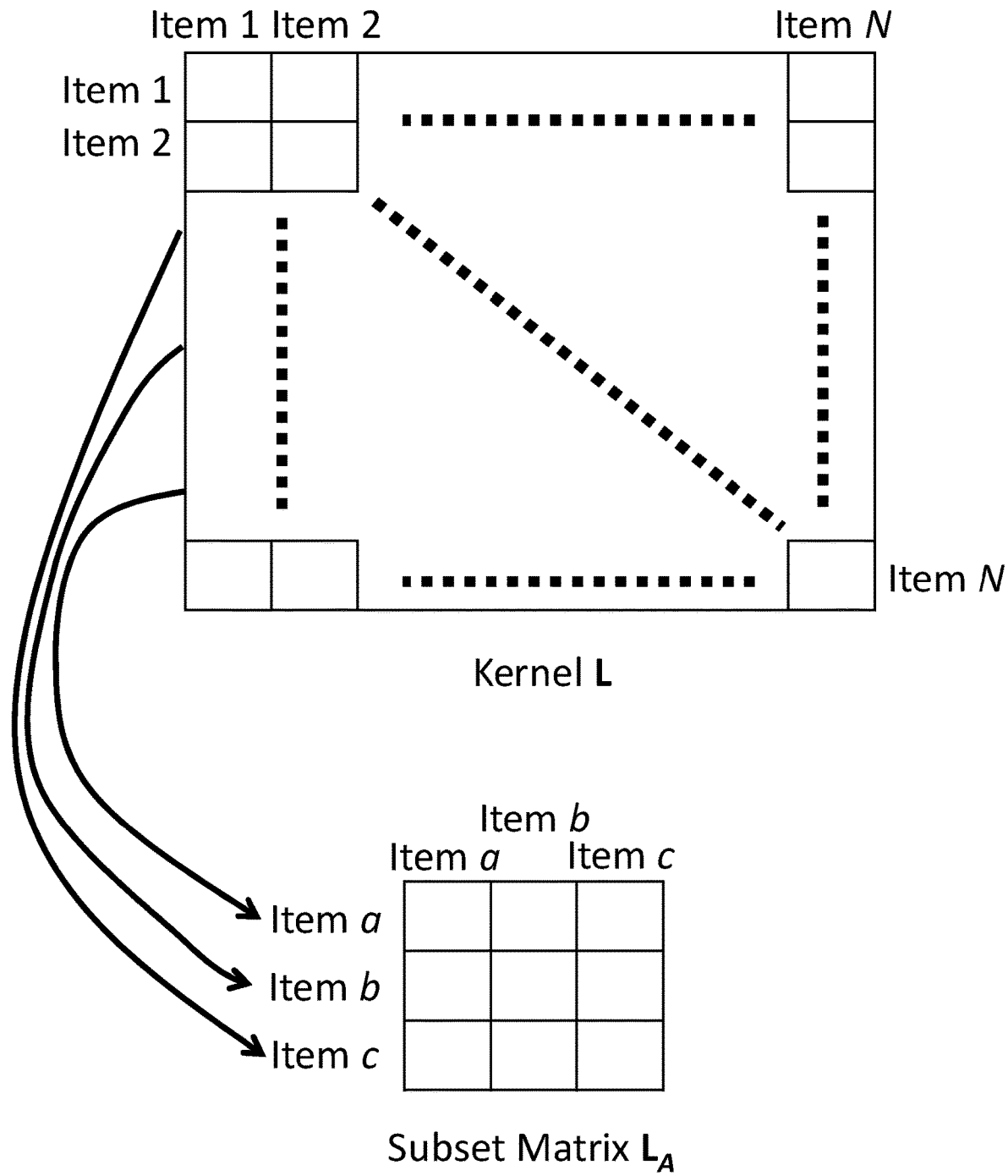
FIG. 1 shows a kernel L and a subset matrix $L_A$ according to an embodiment of the present invention.

FIG. 1 shows a kernel L and a subset matrix $L_A$ according to an embodiment of the present invention. In a Determinantal Point Process (DPP), a probability P(A) that subset A is selected can be represented as:

$$P(A) = \frac{\det(L_A)}{\det(I+L)}. \tag{1}$$

The kernel L is an N×N positive semidefinite matrix, where N may be a number of items. In an embodiment, the kernel L is an asymmetric positive semidefinite matrix. The subset matrix $L_A$ may represent a subset of the kernel L. In an embodiment, the subset matrix $L_A$ may be a principal submatrix of the kernel L indexed by A.

In the embodiment of FIG. 1, the kernel L includes N rows and N columns, each corresponding to N items (i.e., item 1, item 2, . . . , item N). Meanwhile the subset matrix $L_A$ includes 3 rows and 3 columns, each corresponding to an item a, an item b, and an item c. The items a, b, and c are selected from the items 1 . . . N.

In an embodiment, the probability P(A) represents a probability that items a, b, and c are selected among the items 1 . . . N. By using a DPP, it may be possible to predict which item is newly selected in addition to already selected items.

For example, assuming that a subset matrix $L_{A \cup \{d\}}$ corresponds to items a-d, a subset matrix $L_{A \cup \{e\}}$ corresponds to items a, b, and c and e, and a subset matrix $L_{A \cup \{f\}}$ corresponds to items a, b, and c and f, it will be possible to predict which item is selected among items d, e, f in addition to the already selected items a, b, and c by comparing $P(A \cup \{d\})$, $P(A \cup \{e\})$ and $P(A \cup \{f\})$ derived from the subset matrices $L_{A \cup \{d\}}$, $L_{A \cup \{e\}}$, and $L_{A \cup \{f\}}$.

When the kernel L is an asymmetric positive semidefinite matrix, the probability P(A) may represent both positive and negative correlations between items. Meanwhile, when the kernel L is a symmetric positive semidefinite matrix, the probability P(A) may represent only a negative correlation between items.

The positive correlation may mean that if one item is selected, then another item is likely to be selected. The negative correlation may mean that if one item is selected, then another item is unlikely to be selected. The kernel L may be trained by a training data set as explained below.

Figure 2:
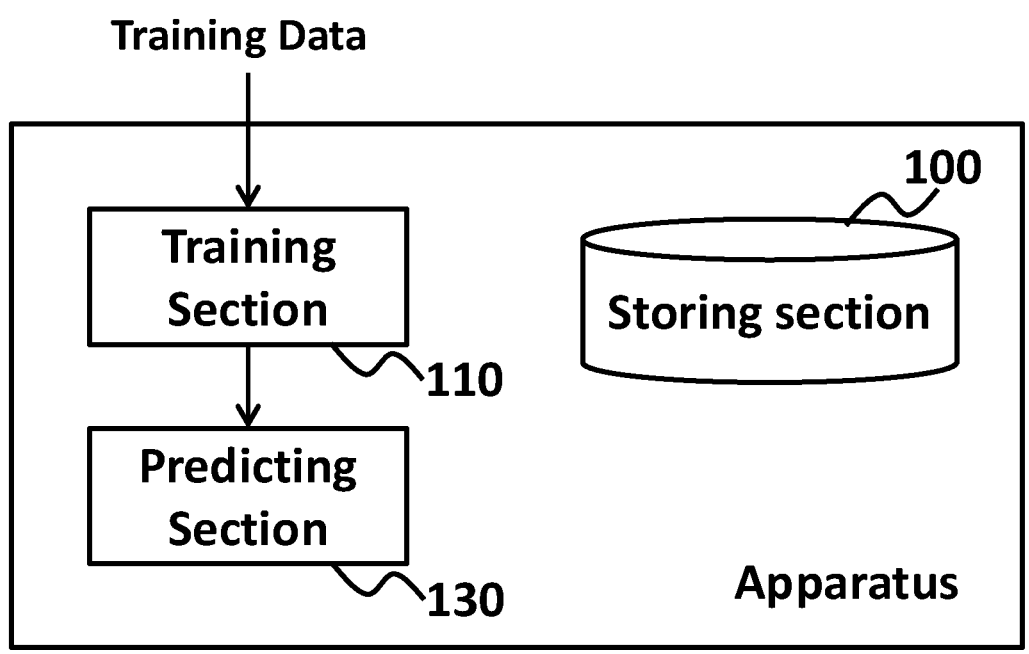
FIG. 2 shows an exemplary configuration of an apparatus 10, according to an embodiment of the present invention.

FIG. 2 shows an exemplary configuration of an apparatus 10, according to an embodiment of the present invention. The apparatus 10 may train an asymmetric kernel of a DPP to enable DPP-based prediction with less computational resources and in less time.

The apparatus 10 may include a processor and/or programmable circuitry. The apparatus 10 may further include one or more computer readable mediums collectively including instructions. The instructions may be embodied on the computer readable medium and/or the programmable circuitry. The instructions, when executed by the processor or the programmable circuitry, may cause the processor or the programmable circuitry to operate as a plurality of operating sections.

Thereby, the apparatus 10 may be regarded as including a storing section 100, a training section 110 and a predicting section 130.

The storing section 100 stores information used for the processing that the apparatus 10 performs. The storing section 100 may also store a variety of data/instructions used for operations of the apparatus 10.

One or more other elements in the apparatus 10 (e.g., the training section 110 and the predicting section 130) may communicate data directly or via the storing section 100, as necessary.

The storing section 100 may be implemented by a volatile or non-volatile memory of the apparatus 10. In some embodiments, the storing section 100 may store a training data set, parameters related to an asymmetric kernel of a DPP, and other parameters and data related thereto.

The training section 110 may train an asymmetric kernel of a DPP from a training data set. The training section 110 may perform the training by calculating an inverse matrix of a sum of the asymmetric kernel and an identity matrix in a recursive manner. The training section 110 may perform the training such that a likelihood of the training data set is increased, for example by using at least a gradient ascent method.

The training section 110 may output the trained asymmetric kernel as at least a part of a prediction model by training the asymmetric kernel as at least a part of a prediction model to make a prediction. In an embodiment, the training section 110 may output the asymmetric kernel to the predicting section 130 such that the apparatus 10 itself performs the prediction using the asymmetric kernel. In another embodiment, the training section 110 may output the asymmetric kernel to another apparatus outside the apparatus 10 such as a server computer.

The predicting section 130 may make a prediction based on a DPP by using the asymmetric kernel output from the training section 110. In an embodiment, the prediction may include a purchase prediction that predicts an item that a customer is likely to purchase. The predicting section 130 may make a recommendation based on the prediction. For example, the predicting section 130 may recommend to the customer an item that a customer is likely to purchase.

In another embodiment, the prediction may include a prediction relating to a selection of actions, contents, genomes, words, etc. In an embodiment, the prediction may include predicting a next action of a person, animal, device, etc. in addition to already taken actions. In another embodiment, the prediction may include making summary of text where some of the words or phrases are selected from an original text.

In an embodiment, the prediction section 130 may be equipped in an apparatus outside the apparatus 10. In the embodiment, the apparatus training the asymmetric kernel and the apparatus utilizing the asymmetric kernel are separated.

Figure 3:
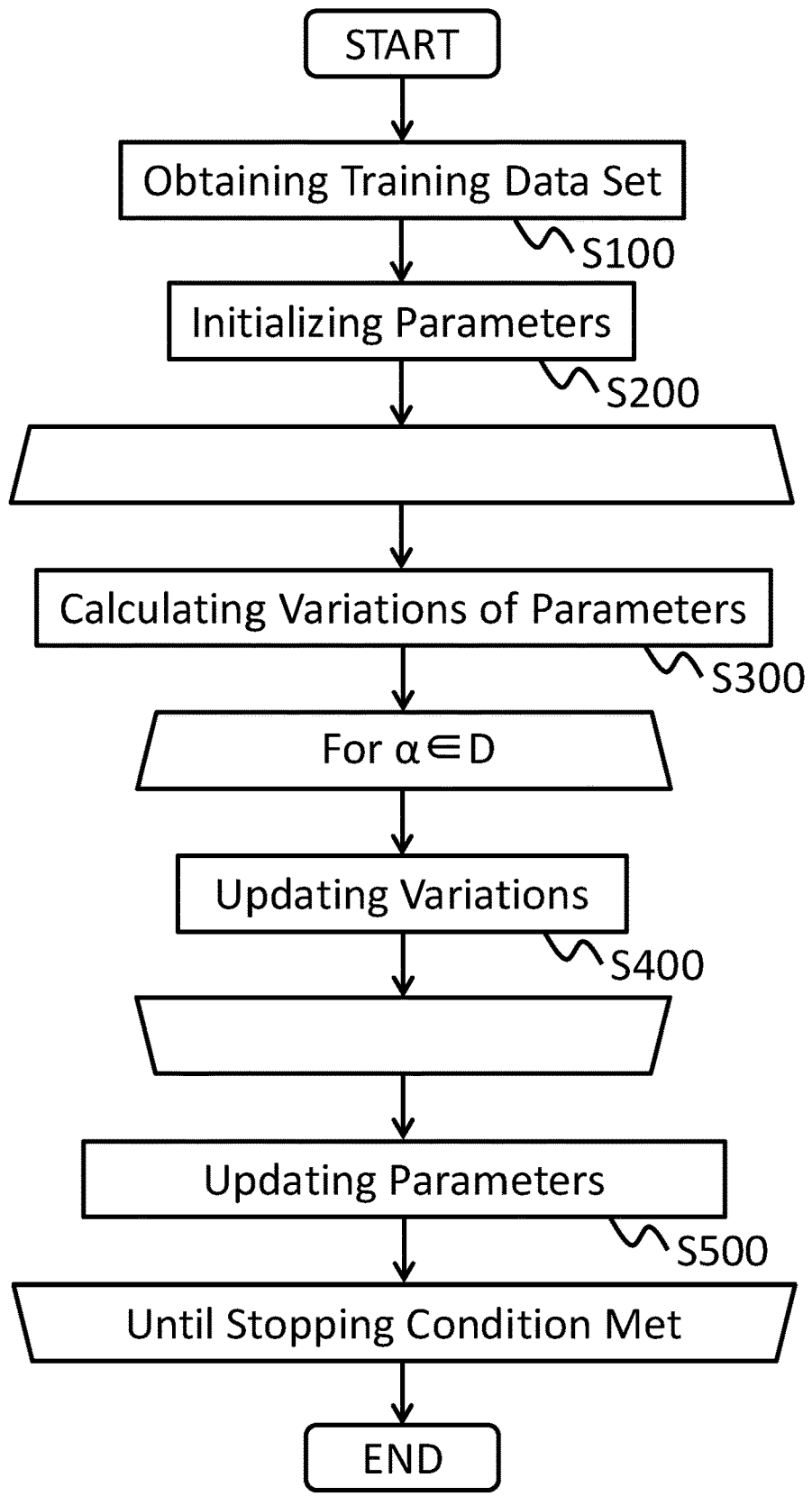
FIG. 3 shows an operational flow for training asymmetric kernels of Determinantal Point Processes, according to an embodiment of the present invention.

FIG. 3 shows an operational flow for training asymmetric kernels of Determinantal Point Processes, according to an embodiment of the present invention. The present embodiment describes an example in which an apparatus, such as the apparatus 10, performs operations from S100 to S500, as shown in FIG. 3, to train an asymmetric kernel.

At S100, a training section such as the training section 110 may obtain a training data set. The training data set may include a plurality of subsets of items.

FIG. 4 shows an example of a training data set D according to an embodiment of the present invention. In the embodiment of FIG. 4, the training data set includes a subset 402, a subset 404, a subset 406, and other subsets. Each subset may include one or more items. The subset 402 includes an item 1, an item 10, and an item 14. The subset 404 includes an item 1 and an item 8. The subset 406 includes an item 21, an item 101, an item 32, and an item 83.

In an embodiment, the training data set D may comprise a purchase history including a plurality of subsets of items purchased by each customer. In the embodiment, the training data set D may be generated from a purchase history indicating that (i) one customer (or a group of customers) purchased item 1, item 10, and item 14, (ii) the customer (or the group of customers) purchased item 1 and item 8, and (iii) the customer (or the group of customers) purchased item 21 item 101, item 32, and item 83.

At S200, the training section 110 may initialize a plurality of parameters of the asymmetric kernel L to be trained.

In an embodiment, the plurality of parameters includes: elements of a first matrix $\Lambda$, elements of a second matrix V, elements of a predetermined number (e.g., K) of first vectors $u^{(1)} \ldots u^{(K)}$, and elements of the predetermined number (e.g., K) of second vectors $v^{(1)} \ldots v^{(K)}$, where K may be an arbitrary number, such as an integer selected from a number smaller to some extent other than the number of items N. In an embodiment, K may be selected from 1-100. When the number of items in the training data set D is N, the asymmetric kernel L is N×N matrix, the first matrix $\Lambda$ is defined as $\text{Diag}(\exp(\lambda))$ where $\text{Diag}(\bullet)$ denotes the diagonal matrix with given elements, and $\exp(\bullet)$ is elementwise.

$\lambda$ is a vector and comprises N elements $\lambda_1, \lambda_2, \lambda_3, \ldots, \lambda_N$. For example, the first matrix $\Lambda$ has $e^{\lambda_1}, e^{\lambda_2}, e^{\lambda_3}, \ldots, e^{\lambda_N}$ as the diagonal elements and 0 as the other elements. A vector $u^{(k)}$ and a vector $u^{(k)}$ ($k \in K$) are an N dimensional column vector. The second matrix V is an N×M matrix, where M is smaller than N. In an embodiment, M may be the same range with K, such as a number selected from 1-100.

The asymmetric kernel L of a DPP may be calculated from the plurality of parameters of the asymmetric kernel L. In an embodiment, the asymmetric kernel L can be represented by a sum of: (i) the first matrix $\Lambda$, (ii) a product of the second matrix V and a transposed matrix $V^T$ of the second matrix, and (iii) a summation of a predetermined number K of differences of a product of the first vector $u^{(k)}$ and the second vector $v^{(k)T}$ and a product of the second vector $v^{(k)}$ and the first vector $u^{(k)T}$. In a specific embodiment, the asymmetric kernel L may be represented by the following formula (2):

$$L = \Lambda + VV^T + \sum_{k=1}^{K}\left(u^{(k)}(v^{(k)})^T - v^{(k)}(u^{(k)})^T\right) \quad (2)$$

At S200, the training section 110 may initialize the first matrix $\Lambda$ (e.g., $\lambda_1, \lambda_2, \lambda_3, \ldots, \lambda_N$), the second matrix V, the first vectors $u^{(1)} \ldots u^{(K)}$, and the second vectors $v^{(1)} \ldots v^{(K)}$. In an embodiment, the training section 110 may allocate an appropriate number (e.g., 0, 1, or random number) to the diagonal elements of the first matrix $\Lambda$ (e.g., $\lambda_1, \lambda_2, \lambda_3, \ldots, \lambda_N$), elements of the second matrix V, elements of the first vectors $u^{(1)} \ldots u^{(K)}$, and elements of the second vectors $v^{(1)} \ldots v^{(K)}$.

After the initialization of S200, the training section 110 may iterate a first loop of operations of S300-S500. During the first loop, the training section 110 may update the plurality of parameters (e.g., elements of V, $\lambda$, $u^{(1)} \ldots u^{(K)}$, $v^{(1)} \ldots v^{(K)}$) of the asymmetric kernel L by using the inverse matrix such that a likelihood of the training data set is increased.

At S300, the training section 110 may calculate variations of the plurality of parameters of the asymmetric kernel L. In an embodiment, the training section 110 may calculate variations of the first matrix $\Lambda$, the second matrix V, the first vectors $u^{(1)} \ldots u^{(K)}$, and the second vectors $v^{(1)} \ldots v^{(K)}$.

The variation (shown as $\Delta_\lambda$) of the first matrix $\Lambda$ is calculated using the following formula (3):

$$\Delta_\lambda = -\nabla_\lambda \log \det(I+L) = \text{diag}((I+L)^{-1}) \odot \text{diag}(\Lambda) \quad (3),$$

where $\odot$ denotes element-wise product and $\text{diag}(\bullet)$ is the diagonal elements of a given matrix. The training section 110 may calculate $\text{diag}((I+L)^{-1}) \odot \text{diag}(\lambda)$ as $\Delta_\lambda$. Here, the training section 110 calculates an inverse matrix of the sum of the asymmetric kernel and the identity matrix (I+L) as a part of the calculation of the formula (3). According to conventional methods, it takes enormous amounts of time and computational resources to calculate the inverse matrix of a huge matrix such as (I+L).

The training section 110 may calculate the inverse matrix in a recursive manner, thereby saving time and computational resources. In an embodiment, the training section 110 may update the inverse matrix (I+L) of a predetermined number (e.g., K) of times, by using each of the predetermined number of first vectors and each of the predetermined number of second vectors. In a specific embodiment, the training section 110 may calculate $(L^{(2)}+I)^{-1}$ from $(L^{(1)}+I)^{-1}$, $(L^{(3)}+I)^{-1}$ from $(L^{(2)}+I)^{-1}$, $(L^{(4)}+I)^{-1}$ from $(L^{(3)}+I)^{-1}$, ..., and $(L^{(K)}+I)^{-1}$ from $(L^{(K-1)}+I)^{-1}$. The training section 110 may obtain $(L^{(K)}+I)^{-1}$ as $(L+I)^{-1}$ used in the formula (3). With the recursive manner, the training section 110 may calculate the inverse matrix within $O((K+M)N^2)$ time, which is much shorter than $O(N^3)$.

Therefore, the training section 110 may train the asymmetric kernel for larger N than conventional methods. This may increase variations of a recommendation made the by a predicting section.

The training section 110 may calculate $(L^{(k)}+I)^{-1}$ ($k \in K$) using the following formula (4):

$$\left(L^{(k)}+I\right)^{-1} = \left(L^{(k-1)}+I\right)^{-1} + \frac{\left(\left(L^{(k-1)}+I\right)^{-1}\left(-(1-a)u^{(k)}\left(v^{(k)}\right)^\top + (1+b)v^{(k)}\left(u^{(k)}\right)^\top - cv^{(k)}\left(v^{(k)}\right)^\top + du^{(k)}\left(u^{(k)}\right)^\top\right)\left(L^{(k-1)}+I\right)^{-1}\right)}{((1-a)(1+b)+cd)}, \quad (4)$$

where a is defined as $u^{(k)\top}(L^{(k-1)}+I)^{-1}v^{(k)}$, b is defined as $v^{(k)\top}(L^{(k-1)}+I)^{-1}u^{(k)}$, c is defined as $u^{(k)\top}(L^{(k-1)}+I)^{-1}u^{(k)}$, and d is defined as $v^{(k)\top}(L^{(k-1)}+I)^{-1}v^{(k)}$.

The variation (shown as $\Delta v$) of the second matrix V is calculated using the following formula (5):

$$\Delta_V = -\nabla_V \log \det(I+L) = ((I+L)^{-1} + ((I+L)^{-1})^T)V \quad (5).$$

In an embodiment, the training section 110 may calculate $\Delta_v$ by using $(I+L)^{-1}$ that has already been calculated by the formula (4), or again calculate $(I+L)^{-1}$ to obtain $\Delta_v$ by using the formula (4).

The variation (shown as $\Delta_{u(k)}$) of the first vector $u^{(k)}$ ($k \in K$) is calculated using the following formula (6):

$$\Delta_{u(k)} = -\nabla_{u(k)} \log \det(I+L) = ((I+L)^{-1} + ((I+L)^{-1})^T)u^{(k)} \quad (6).$$

In an embodiment, the training section 110 may calculate $\Delta_{u(k)}$ by using $(I+L)^{-1}$ that has already been calculated by the formula (4), or again calculate $(I+L)^{-1}$ to obtain $\Delta_{u(k)}$ by using the formula (4).

The variation (shown as $\Delta_{v(k)}$ of the second vector $v^{(k)}$ ($k \in K$) is calculated using the following formula (7):

$$\Delta_{v(k)} = -\nabla_{v(k)} \log \det(I+L) = ((I+L)^{-1} + ((I+L)^{-1})^T)v^{(k)} \quad (7)$$

In an embodiment, the training section 110 may calculate $\Delta_{v(k)}$ by using $(I+L)^{-1}$ that has already been calculated by the formula (4), or again calculate $(I+L)^{-1}$ to obtain $\Delta_{v(k)}$ by using the formula (4).

After the operation of S300, the training section 110 may iterate a second loop of operation of S400. The training section 110 may perform the operation of S400 for each subset a in the training data set D. For an example of the training data set D shown in FIG. 4, the training section 110 may perform an operation of S400 for the subset 402, an operation of S400 for the subset 404, an operation of S400 for the subset 406, and so on. The training section 110 may perform the operation of S400 for all or some of the subsets in the training data set.

At the operations of S400, the training section 110 may update the variations calculated at S300. In an embodiment, at each operation of S400, the training section 110 may update some of the variations of $\Lambda$, V, $u^{(k)}$, and $v^{(k)}$ corresponding to a subset $\alpha$.

The training section 110 may update the variation $\Delta_\lambda$ of the first matrix $\Lambda$ as shown below:

$$(\Delta_\lambda)_\alpha = (\Delta_\lambda)_\alpha + \nabla_{\lambda_\alpha} \log \det(L_{\alpha\alpha}) \quad (8),$$

where a matrix $L_{xy}$ represents a submatrix of L where rows are indexed by $x \in \{1, 2, \ldots, N\}$ and columns are indexed by $y \in \{1, 2, \ldots, N\}$, and $(\Delta_\lambda)_x$ represents a sub vector of $\Delta_\lambda$ where elements are indexed by x. The training section 110 may calculate $\nabla_{\lambda_\alpha} \log \det(L_{\alpha\alpha})$ using the following formula (9):

$$\nabla_{\lambda_\alpha} \log \det(L_{\alpha\alpha}) = \text{diag}(L_{\alpha\alpha}^{-1}) \odot \text{diag}(\Lambda_{\alpha\alpha}) \quad (9),$$

where $\Lambda_{xy}$ is a submatrix of the first matrix $\Lambda$ where rows are indexed by $x \in \{1, 2, \ldots, N\}$ and columns are indexed by $y \in \{1, 2, \ldots, N\}$.

In embodiments, the training section 110 calculates an inverse matrix of $L_{\alpha\alpha}$, as part of the calculation of the formula (9). In an embodiment, when a size of $L_{\alpha\alpha}$, is small (e.g., smaller than 10×10 matrix), then the training section 110 may calculate $L_{\alpha\alpha}^{-1}$ in a naïve manner. In an embodiment, the training section 110 may calculate $L_{\alpha\alpha}^{-1}$ in a similar manner as explained in the formula (4). For example, the training section 110 may calculate $(L_{\alpha\alpha}^{(k)})^{-1}$ ($k \in K$) to obtain $(L_{\alpha\alpha}^{(K)})^{-1}$ as $L_{\alpha\alpha}^{-1}$ using the following formula (4'):

$$\left(L_{\alpha\alpha}^k\right)^{-1} = \left(L_{\alpha\alpha}^{(k-1)}\right)^{-1} + \frac{\left(L_{\alpha\alpha}^{(k-1)}\right)^{-1}\left(-(1-a)u^{(k)}\left(v^{(k)}\right)^\top + (1+b)v^{(k)}\left(u^{(k)}\right)^\top - cv^{(k)}\left(v^{(k)}\right)^\top + du^{(k)}\left(u^{(k)}\right)^\top\right)\left(L_{\alpha\alpha}^{(k-1)}\right)^{-1}}{(1-a)(1+b)+cd}, \quad (4')$$

where a is defined as $u^{(k)T}(L_{\alpha\alpha}^{(k-1)})^{-1}v^{(k)}$, b is defined as $v^{(k)T}(L_{\alpha\alpha}^{(k-1)})^{-1}u^{(k)}$, c is defined as $u^{(k)T}(L_{\alpha\alpha}^{(k-1)})^{-1}u^{(k)}$, and d is defined as $v^{(k)T}(L_{\alpha\alpha}^{(k-1)})^{-1}v^{(k)}$.

The training section 110 may update the variation $\Delta_V$ of the second matrix V as shown below:

$$(\Delta_V)_{\alpha\Omega} = (\Delta_V)_{\alpha\Omega} + \nabla_{V_{\alpha\Omega}} \log \det(L_{\alpha\alpha}) \quad (10),$$

where $(\Delta_V)_{x\Omega}$ represents a submatrix of $\Delta v$ having rows of $\Delta_v$ indexed by $x \in \{1, 2, \ldots, N\}$. The training section 110 may calculate $\nabla_{\lambda_\alpha} \log \det(L_{\alpha\alpha})$ using the following formula (11):

$$\nabla_{V_{\alpha\Omega}} \log \det(L_{\alpha\alpha}) = (L_{\alpha\alpha}^{-1} + (L_{\alpha\alpha}^{-1})^T) V_{\alpha\Omega} \quad (11),$$

where $V_{x\Omega}$ represents a submatrix of the second matrix V having rows of V indexed by $x \in \{1, 2, \ldots, N\}$.

In an embodiment, the training section 110 may calculate $(\Delta_V)_{x\Omega}$ by using $L_{\alpha\alpha}^{-1}$ that has already been calculated for the formula (9), or again calculate $L_{\alpha\alpha}^{-1}$ to obtain $(\Delta_V)_{x\Omega}$ by using the formula (4').

The training section 110 may update the variation $\Delta u^{(k)}$ of the first vectors $u^{(k)}$ for k=1 . . . K as shown below:

$$(\nabla_{u^{(k)}})_\alpha = (\nabla_{u^{(k)}})_\alpha + \nabla_{u^{(k)}\alpha} \log \det(L_{\alpha\alpha}) \quad (12),$$

where $(\Delta u^{(k)})_x$ represents a subvector of $\Delta u^{(k)}$ indexed by $x \in \{1, 2, \ldots, N\}$. The training section 110 may calculate $\nabla_{u^{(k)}\alpha} \log \det(L_{\alpha\alpha})$ using the following formula (13):

$$\nabla_{u^{(k)}\alpha} \log \det(L_{\alpha\alpha}) = (L_{\alpha\alpha}^{-1} + (L_{\alpha\alpha}^{-1})^T) v_\alpha^{(k)} \quad (13),$$

where $v^{(k)}_x$ represents a subvector of the second vector $v^{(k)}$ indexed by $x \in \{1, 2, \ldots, N\}$.

In an embodiment, the training section 110 may calculate $\Delta u^{(k)}$ by using $L_{\alpha\alpha}^{-1}$ that has already been calculated for the formula (9), or again calculate $L_{\alpha\alpha}^{-1}$ to obtain $\Delta u^{(k)}$ by using the formula (4').

The training section 110 may update the variation $\Delta v^{(k)}$ of the second vectors $v^{(k)}$ for k=1 . . . K as shown below:

$$(\Delta_{v^{(k)}})_\alpha = (\Delta_{v^{(k)}})_\alpha + \nabla_{v^{(k)}\alpha} \log \det(L_{\alpha\alpha}) \quad (14),$$

where $(\Delta v^{(k)})_x$ represents a subvector of $\Delta v^{(k)}$ indexed by $x \in \{1, 2, \ldots, N\}$. The training section 110 may calculate $\nabla_{v^{(k)}\alpha} \log \det(L_{\alpha\alpha})$ using the following formula (15):

$$\nabla_{v^{(k)}\alpha} \log \det(L_{\alpha\alpha}) = (L_{\alpha\alpha}^{-1} + (L_{\alpha\alpha}^{-1})^T) u_\alpha^{(k)} \quad (15),$$

where $u^{(k)}_x$ represents a subvector of the second vector $u^{(k)}$ indexed by $x \in \{1, 2, \ldots, N\}$.

In an embodiment, the training section 110 may calculate $\Delta v^{(k)}$ by using $L_{\alpha\alpha}^{-1}$ that has already been calculated for the formula (9), or again calculate $L_{\alpha\alpha}^{-1}$ to obtain $\Delta v^{(k)}$ by using the formula (4').

After the loop of S400, the training section 110 may perform an operation of S500. At S500, the training section 110 may update the plurality of parameters of the asymmetric kernel L by using the variations that are calculated at S300 and updated at S400. The training section 110 may update the vector $\lambda$ which represents the diagonal component of the first matrix A, the second matrix V, the first vectors $v^{(1)} \ldots v^{(K)}$ and the second vectors $u^{(1)} \ldots u^{(K)}$.

In an embodiment, the training section 110 may update the vector A using the following formula (16):

$$\lambda = \lambda + \eta \Delta_\lambda \quad (16),$$

where $\eta$ is a hyperparameter that is a learning rate. In an embodiment, q is set in a range between 0.001-0.1.

In an embodiment, the training section 110 may update the second matrix V, the first vectors $u^{(k)}$ and the second vectors $v^{(k)}$ using the following formulae (17, 18, and 19):

$$V = V + \eta \Delta_V \quad (17),$$

$$u^{(k)} = u^{(k)} + \eta \Delta_{u^{(k)}}, \forall k \quad (18),$$

$$v^{(k)} = v^{(k)} + \Delta_{u^{(k)}}, \forall k \quad (19).$$

By iterating the first loop of S300-S500, the training section 110 may train the parameters of the asymmetric kernel L with a gradient ascent method such that the likelihood of the training data set D is increased.

The training section 110 may iterate the first loop until a stopping condition is met. The stopping condition may be a condition usually used in gradient ascent. The stopping condition may be that the training of the asymmetric kernel L has converged, or that a predetermined time has passed. In an embodiment, the training section 110 may end the first loop when magnitudes of one or more of $\Delta_\lambda$, $\Delta v$, $\Delta_{u^{(k)}}$, and $\Delta_{v^{(k)}}$ fall below corresponding thresholds.

By performing the operation of FIG. 3, the training section 110 trains $\lambda$, V, $u^{(k)}$, and $v^{(k)}$, and thereby obtains the asymmetric kernel L calculated from $\lambda$, V, $u^{(k)}$, and $v^{(k)}$. By using the asymmetric kernel L, a predicting section such as the predicting section 130 may make a DPP-based prediction. For example, when the training data set comprises a purchase history of items purchased by each customer, the prediction model may output a probability that a customer purchases a set of items.

The predicting section 130 may make a recommendation by using the asymmetric kernel L. In an embodiment, for a customer who has already purchased a subset of product $\alpha$, the predicting section 130 may recommend a product i that maximizes the conditional probability of selecting i given that a has already been selected: $P(\alpha \cup \{i\} | \alpha)$ using the formula (1). Thereby, the predicting section 130 may recommend an item that is likely to be purchased by the customer.

The predicting section 130 may find the product i that maximizes $P(\alpha \cup \{i\} | \alpha)$ by using the diagonal element of $L' = L_{\bar{\alpha}\bar{\alpha}} - L_{\bar{\alpha}\alpha} L_{\alpha\alpha}^{-1} L_{\alpha\bar{\alpha}}$, where $\bar{\alpha}$ is the set of items not in $\alpha$ and $L_{xy}$ denotes the submatrix of L where rows are indexed by x and columns are indexed by y. The i-th diagonal element of L' is $P(\alpha \cup \{i\} | \alpha)$. Therefore, the predicting section 130 may identify the largest diagonal element in L' as the product i to be recommended.

In some embodiments, the predicting section 130 may train the asymmetric kernel L in a personalized manner. Thereby, the predicting section 130 may make a personalized recommendation. The predicting section 130 may recommend an item to each customer by using the probability that the each customer purchases a set of items, output by the prediction model including the asymmetric kernel. According to the embodiments of the present invention, since the asymmetric kernel may be trained with less time and resource, the asymmetric kernel may be more finely personalized.

For example, the training section 110 may train an asymmetric kernel $L^{(1)}$ for a person 1, an asymmetric kernel $L^{(2)}$ for a person 2, and an asymmetric kernel $L^{(3)}$ for a person 3 . . . In an embodiment, $L^{(1)}$-$L^{(3)}$ may represent customers belonging to different clusters (e.g., different age-groups).

According to an embodiment, at least a part of $L^{(1)}$-$L^{(3)}$ are shared by persons 1-3. The asymmetric kernels $L^{(1)}$-$L^{(3)}$ may be represented by the following formulae (2-1, 2-2, and 2-3):

$$L^{(1)} = \Lambda + VV^\top + \sum_{k=1}^{K} \left( u_1^{(k)} \left( v_1^{(k)} \right)^\top - v_1^{(k)} \left( u_1^{(k)} \right)^\top \right), \quad (2\text{-}1)$$

-continued $$L^{(2)} = L^{(1)} + \sum_{k=1}^{K}(u_2^{(k)}(v_2^{(k)})^\top - v_2^{(k)}(u_2^{(k)})^\top),\quad (2\text{-}2)$$

$$L^{(3)} = L^{(1)} + \sum_{k=1}^{K}(u_3^{(k)}(v_3^{(k)})^\top - v_3^{(k)}(u_3^{(k)})^\top).\quad (2\text{-}3)$$

The training section 110 may train $L^{(1)}$, $L^{(2)}$, and $L^{(3)}$ by using the flow chart illustrated in FIG. 3. As illustrated in the flow chart of FIG. 3, the training section 110 may additionally train $u_2^{(k)}$, $u_3^{(k)}$, $v_2^{(k)}$, $v_3^{(k)}$ for k=1 . . . K. The training section 110 may only need to calculate $(I+L^{(1)})^{-1}$, $(I+L^{(2)})^{-1}$ and $(I+L^{(3)})^{-1}$. However, once the training section 110 calculates $(I+L^{(1)})^{-1}$, the training section 110 may efficiently calculate $(I+L^{(2)})^{-1}$ and $(I+L^{(3)})^{-1}$ since the $L^{(1)}$ portion is shared.

In an embodiment, the training section 110 may periodically train the asymmetric kernel. For example, when the training section 110 may obtain a new training data set in addition to an already-used training data set, the training section 110 may again train the asymmetric kernel with the both training data sets, or, only the new training data set. According to conventional methods, it may be difficult to periodically update the asymmetric kernel due to many computational resources and much time required to do so. Meanwhile according to the embodiments of the prevent invention, the training section 110 may periodically update the asymmetric kernel with a realistic amount of resource and time. Thereby the training section 110 may improve a quality of the prediction model including the asymmetric kernel.

FIG. 5 shows an exemplary algorithm for training asymmetric kernels of Determinantal Point Processes, according to an embodiment of the present invention. In an embodiment, the training section 110 may execute the algorithm shown in FIG. 5 to perform the operations of S200-S500 shown in FIG. 3.

In the algorithm, a line 1 may correspond to the operation of S200. Lines 2-16 may correspond to the first loop of S300-S500. Lines 3-6 may correspond to the operation of S300. Lines 7-11 may correspond to the second loop of S400 and lines 8-11 may correspond to S400. Lines 12-15 may correspond to S500.

FIG. 6 shows an exemplary algorithm to calculate variations in parameters, according to an embodiment of the present invention. In an embodiment, the training section 110 may execute the algorithm shown in FIG. 6 to calculate $(I+L)^{-1}$ in the recursive manner.

Various embodiments of the present invention may be described with reference to flowcharts and block diagrams whose blocks may represent (1) steps of processes in which operations are performed or (2) sections of apparatuses responsible for performing operations. Certain steps and sections may be implemented by dedicated circuitry, programmable circuitry supplied with computer-readable instructions stored on computer-readable media, and/or processors supplied with computer-readable instructions stored on computer-readable media. Dedicated circuitry may include digital and/or analog hardware circuits and may include integrated circuits (IC) and/or discrete circuits. Programmable circuitry may include reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server.

In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 7:
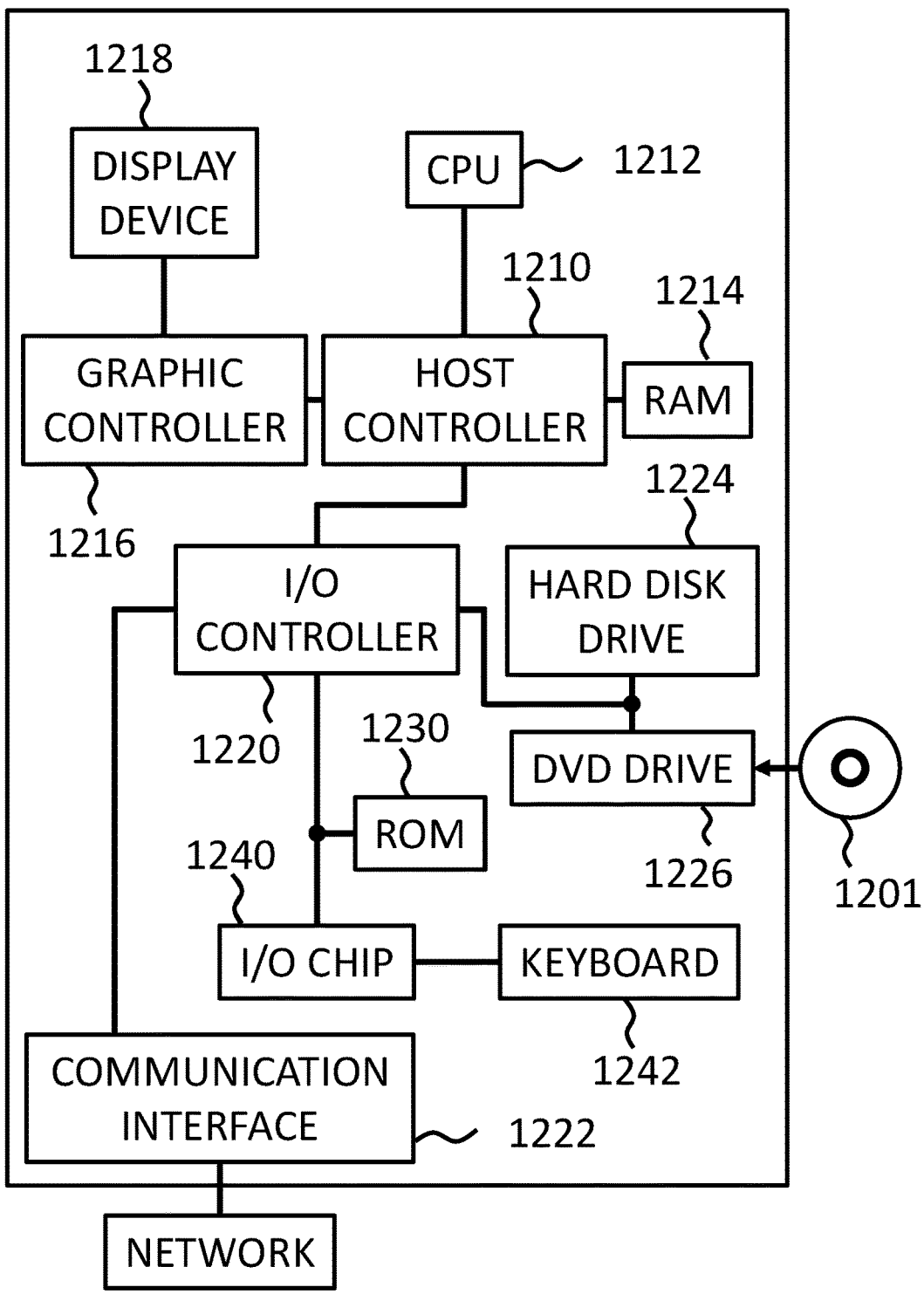
FIG. 7 shows an exemplary hardware configuration of a computer that functions as a system, according to an embodiment of the present invention.

FIG. 7 shows an example of a computer 1200 in which aspects of the present invention may be wholly or partly embodied. A program that is installed in the computer 1200 can cause the computer 1200 to function as or perform operations associated with apparatuses of the embodiments of the present invention or one or more sections thereof, and/or cause the computer 1200 to perform processes of the embodiments of the present invention or steps thereof. Such a program may be executed by the CPU 1212 to cause the computer 1200 to perform certain operations associated with some or all of the blocks of flowcharts and block diagrams described herein.

The computer 1200 according to the present embodiment includes a CPU 1212, a RAM 1214, a graphics controller 1216, and a display device 1218, which are mutually connected by a host controller 1210. The computer 1200 also includes input/output units such as a communication interface 1222, a hard disk drive 1224, a DVD-ROM drive 1226 and an IC card drive, which are connected to the host controller 1210 via an input/output controller 1220. The computer also includes legacy input/output units such as a ROM 1230 and a keyboard 1242, which are connected to the input/output controller 1220 through an input/output chip 1240.

The CPU 1212 operates according to programs stored in the ROM 1230 and the RAM 1214, thereby controlling each unit. The graphics controller 1216 obtains image data generated by the CPU 1212 on a frame buffer or the like provided in the RAM 1214 or in itself, and causes the image data to be displayed on the display device 1218.

The communication interface 1222 communicates with other electronic devices via a network. The hard disk drive 1224 stores programs and data used by the CPU 1212 within the computer 1200. The DVD-ROM drive 1226 reads the programs or the data from the DVD-ROM 1201, and provides the hard disk drive 1224 with the programs or the data via the RAM 1214. The IC card drive reads programs and data from an IC card, and/or writes programs and data into the IC card.

The ROM 1230 stores therein a boot program or the like executed by the computer 1200 at the time of activation, and/or a program depending on the hardware of the computer 1200. The input/output chip 1240 may also connect various input/output units via a parallel port, a serial port, a keyboard port, a mouse port, and the like to the input/output controller 1220.

A program is provided by computer readable media such as the DVD-ROM 1201 or the IC card. The program is read from the computer readable media, installed into the hard disk drive 1224, RAM 1214, or ROM 1230, which are also examples of computer readable media, and executed by the CPU 1212. The information processing described in these programs is read into the computer 1200, resulting in cooperation between a program and the above-mentioned various types of hardware resources. An apparatus or method may be constituted by realizing the operation or processing of information in accordance with the usage of the computer 1200.

For example, when communication is performed between the computer 1200 and an external device, the CPU 1212 may execute a communication program loaded onto the RAM 1214 to instruct communication processing to the communication interface 1222, based on the processing described in the communication program. The communication interface 1222, under control of the CPU 1212, reads transmission data stored on a transmission buffering region provided in a recording medium such as the RAM 1214, the hard disk drive 1224, the DVD-ROM 1201, or the IC card, and transmits the read transmission data to a network or writes reception data received from a network to a reception buffering region or the like provided on the recording medium.

In addition, the CPU 1212 may cause all or a necessary portion of a file or a database to be read into the RAM 1214, the file or the database having been stored in an external recording medium such as the hard disk drive 1224, the DVD-ROM drive 1226 (DVD-ROM 1201), the IC card, etc., and perform various types of processing on the data on the RAM 1214. The CPU 1212 may then write back the processed data to the external recording medium.

Various types of information, such as various types of programs, data, tables, and databases, may be stored in the recording medium to undergo information processing. The CPU 1212 may perform various types of processing on the data read from the RAM 1214, which includes various types of operations, processing of information, condition judging, conditional branch, unconditional branch, search/replace of information, etc., as described throughout this disclosure and designated by an instruction sequence of programs, and writes the result back to the RAM 1214. In addition, the CPU 1212 may search for information in a file, a database, etc., in the recording medium. For example, when a plurality of entries, each having an attribute value of a first attribute associated with an attribute value of a second attribute, are stored in the recording medium, the CPU 1212 may search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The above-explained program or software modules may be stored in the computer readable media on or near the computer 1200. In addition, a recording medium such as a hard disk or a RAM provided in a server system connected to a dedicated communication network or the Internet can be used as the computer readable media, thereby providing the program to the computer 1200 via the network.

While the embodiments of the present invention have been described, the technical scope of the invention is not limited to the above described embodiments. It will be apparent to persons skilled in the art that various alterations and improvements can be added to the above-described embodiments. It should also be apparent from the scope of the claims that the embodiments added with such alterations or improvements are within the technical scope of the invention.

Many of the embodiments of the present invention include artificial intelligence, machine learning, and model training in particular. A model usually starts as a configuration of random values. Such untrained models must be trained before they can be reasonably expected to perform a function with success. Many of the processes described herein are for the purpose of training asymmetric kernels of Determinantal Point Processes. Once trained, an asymmetric kernel can be used for Determinantal Point Processes, and may not require further training. In this way, a trained asymmetric kernel is a product of the process of training an untrained model.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A computer-implemented method comprising:
obtaining, using a hardware processor, a training data set stored on one or more computer readable storage mediums operably coupled to the hardware processor;
training an asymmetric kernel of a Determinantal Point Process (DPP) from the training data set by calculating an inverse matrix of a sum of the asymmetric kernel and an identity matrix in a recursive manner by updating the inverse matrix of the sum of the asymmetric kernel and the identity matrix a predetermined of number of times using each of a predetermined number of first vectors $u^{(1)} \ldots u^{(K)}$ and each of a predetermined number of second vectors $v^{(1)} \ldots v^{(K)}$, the asymmetric kernel being a N×N positive semidefinite matrix that is represented as a sum of a first matrix $\Lambda$, a product of a second matrix $V$ and a transpose matrix $V^T$ of the second matrix $V$, and a summation of a predetermined number of K differences between a product of a first vector $u^{(k)}$ and a transpose $(v^{(k)})^T$ of a second vector $v^{(k)}$ and a product of the second vector $v^{(k)}$ and a transpose $(u^{(k)})^T$ of the first vector $u^{(k)}$, wherein the first vector $u^{(k)}$ and the second vector $v^{(k)}$ are column vectors; and
determining a prediction model by training the asymmetric kernel as at least part of a prediction model to make a prediction.

2. The method of claim 1, further comprising:
storing a purchase history as the training data set in the one or more computer readable storage mediums, the purchase history including a plurality of subsets of items purchased by a customer,
wherein the prediction model is trained to output a probability that the customer purchases a set of items.

3. The method of claim 1, wherein the asymmetric kernel is calculated from a plurality of parameters, and
wherein training the asymmetric kernel of the DPP from the training data set includes:
updating the plurality of parameters of the asymmetric kernel using the inverse matrix.

4. The method of claim 3, wherein the plurality of parameters includes:
elements of the first matrix;
elements of the second matrix;
elements of the first vectors; and
elements of the second vectors.

5. The method of claim 4, wherein the plurality of parameters includes:
the predetermined number of first vectors $u^{(1)} \ldots u^{(K)}$; and
the predetermined number of second vectors $v^{(1)} \ldots v^{(K)}$.

6. An apparatus comprising:
a processor or programmable circuitry; and
one or more computer readable storage mediums collectively including instructions that, when executed by the processor or the programmable circuitry, cause the processor or the programmable circuitry to perform operations including:
obtaining a training data set stored on the one or more computer readable storage mediums;
training an asymmetric kernel of a Determinantal Point Process (DPP) from the training data set by calculating an inverse matrix of a sum of the asymmetric kernel and an identity matrix in a recursive manner by updating the inverse matrix of the sum of the asymmetric kernel and the identity matrix a predetermined of number of times using each of a predetermined number of first vectors $u^{(1)} \ldots u^{(K)}$ and each of a predetermined number of second vectors $v^{(1)} \ldots v^{(K)}$, the asymmetric kernel being a N×N positive semidefinite matrix that is represented as a sum of a first matrix $\Lambda$, a product of a second matrix V and a transpose matrix $V^T$ of the second matrix V, and a summation of a predetermined number of K differences between a product of a first vector $u^{(k)}$ and a transpose $(v^{(k)})^T$ of a second vector $v^{(k)}$ and a product of the second vector $v^{(k)}$ and a transpose $(u^{(k)})^T$ of the first vector $u^{(k)}$, wherein the first vector $u^{(k)}$ and the second vector $v^{(k)}$ are column vectors; and determining a prediction model by training the asymmetric kernel as at least part of the prediction model to make a prediction.

7. The apparatus of claim 6, further comprising:
a memory, the memory storing a training data set including a purchase history including a plurality of subsets of items purchased by a customer,
wherein the prediction model is trained to output a probability that the customer purchases a set of items.

8. The apparatus of claim 6, wherein the instructions, when executed by the processor or programmable circuitry, cause the processor or programmable circuitry to calculate the asymmetric kernel from a plurality of parameters, and
wherein training the asymmetric kernel from the training data set includes:
updating the plurality of parameters of the asymmetric kernel using the inverse matrix.

9. The apparatus of claim 8, wherein the plurality of parameters includes:
elements of the first matrix;
elements of the second matrix;
elements of the first vectors; and
elements of the second vectors.

10. The apparatus of claim 9, wherein the plurality of parameters includes:
the predetermined number of first vectors $u^{(1)} \ldots u^{(K)}$; and
the predetermined number of second vectors $v^{(1)} \ldots v^{(K)}$.

11. A computer program product, comprising:
one or more computer readable storage mediums collectively storing program instructions that are executable by a processor or programmable circuitry to cause the processor or programmable circuitry to perform operations comprising:
obtaining a training data set stored on the one or more computer readable storage mediums;
training an asymmetric kernel of a Determinantal Point Process (DPP) from a training data set by calculating an inverse matrix of a sum of the asymmetric kernel and an identity matrix in a recursive manner by updating the inverse matrix of the sum of the asymmetric kernel and the identity matrix a predetermined of number of times using each of a predetermined number of first vectors $u^{(1)} \ldots u^{(K)}$ and each of a predetermined number of second vectors $v^{(1)} \ldots$ $v^{(K)}$, the asymmetric kernel being a N×N positive semidefinite matrix that is represented as a sum of a first matrix $\Lambda$, a product of a second matrix V and a transpose matrix $V^T$ of the second matrix V, and a summation of a predetermined number of K differences between a product of a first vector $u^{(k)}$ and a transpose $(v^{(k)})^T$ of a second vector $v^{(k)}$ and a product of the second vector $v^{(k)}$ and a transpose $(u^{(k)})^T$ of the first vector $u^{(k)}$ wherein the first vector $u^{(k)}$ and the second vector $v^{(k)}$ are column vectors; and determining a prediction model by training the asymmetric kernel as at least part of the prediction model to make a prediction.

12. The computer program product of claim 11, wherein the instructions, when executed by the processor or programmable circuitry, cause the processor or programmable circuitry to store a purchase history as the training data set in a memory, the purchase history including a plurality of subsets of items purchased by each customer,
wherein the prediction model is trained to output a probability that a customer purchases a set of items.

13. The computer program product of claim 11, wherein the instructions, when executed by the processor or programmable circuitry, cause the processor or programmable circuitry to calculate the asymmetric kernel from a plurality of parameters, and
wherein training the asymmetric kernel of the DPP from the training data set includes:
updating the plurality of parameters of the asymmetric kernel using the inverse matrix.

14. The computer program product of claim 13, wherein the plurality of parameters includes:
elements of the first matrix;
elements of the second matrix;
elements of the first vectors; and
elements of the second vectors.

15. The computer program product of claim 14, wherein the plurality of parameters includes:
the predetermined number of first vectors $u^{(1)} \ldots u^{(K)}$; and
the predetermined number of second vectors $v^{(1)} \ldots v^{(K)}$.

16. The method of claim 4, wherein the asymmetric kernel is represented as L, and is determined as follows:

$$L = \Lambda + VV^T + \sum_{k=1}^{K} \left( u^{(k)} \left( v^{(k)} \right)^T - v^{(k)} \left( u^{(k)} \right)^T \right).$$

17. The apparatus of claim 9, wherein the asymmetric kernel is represented as L, and is determined as follows:

$$L = \Lambda + VV^T + \sum_{k=1}^{K} \left( u^{(k)} \left( v^{(k)} \right)^T - v^{(k)} \left( u^{(k)} \right)^T \right).$$

* * * * *